United States Patent
Cao et al.

(10) Patent No.: US 8,802,220 B2
(45) Date of Patent: Aug. 12, 2014

(54) HOUSING FOR ELECTRONIC DEVICES AND METHOD FOR MAKING HOUSING

(75) Inventors: Da-Hua Cao, Shenzhen (CN); Xu Liu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/566,042

(22) Filed: Aug. 3, 2012

(65) Prior Publication Data

US 2013/0257237 A1 Oct. 3, 2013

(30) Foreign Application Priority Data

Mar. 29, 2012 (CN) .......................... 2012 1 0087699

(51) Int. Cl.
*B32B 3/00* (2006.01)
(52) U.S. Cl.
USPC ......... 428/195.1; 428/201; 428/203; 428/207
(58) Field of Classification Search
USPC ................................. 428/201, 207
See application file for complete search history.

(56) References Cited

U.S. PATENT DOCUMENTS

| | | | |
|---|---|---|---|
| 2009/0258234 A1* | 10/2009 | Chiang et al. | 428/412 |
| 2010/0098890 A1* | 4/2010 | Hou et al. | 428/35.9 |
| 2010/0098920 A1* | 4/2010 | Hou et al. | 428/201 |
| 2010/0104786 A1* | 4/2010 | Chiang et al. | 428/35.7 |
| 2010/0112293 A1* | 5/2010 | Li et al. | 428/161 |
| 2011/0159277 A1* | 6/2011 | Chiang et al. | 428/336 |
| 2011/0256361 A1* | 10/2011 | Du et al. | 428/195.1 |

* cited by examiner

*Primary Examiner* — Elizabeth Mulvaney
(74) *Attorney, Agent, or Firm* — Novak Druce Connolly Bove + Quigg LLP

(57) ABSTRACT

A housing for an electronic device includes a substrate made of plastic, a base paint layer, a pattern layer, a tin layer, a silicon oxide layer, and a top paint layer. The substrate has an outer surface and an inner surface opposite to the outer surface and facing the interior of the electronic device. The base paint layer is formed on the outer surface. The pattern layer is directly formed on the base paint layer and partially covers the base paint layer. The tin layer is directly formed on the pattern layer and covers the pattern layer and portions of the base paint layer not covered by the pattern layer. The silicon oxide layer is directly formed on the entire tin layer. The top paint layer is formed on the silicon oxide layer. A method for making the housing is also described.

18 Claims, 1 Drawing Sheet

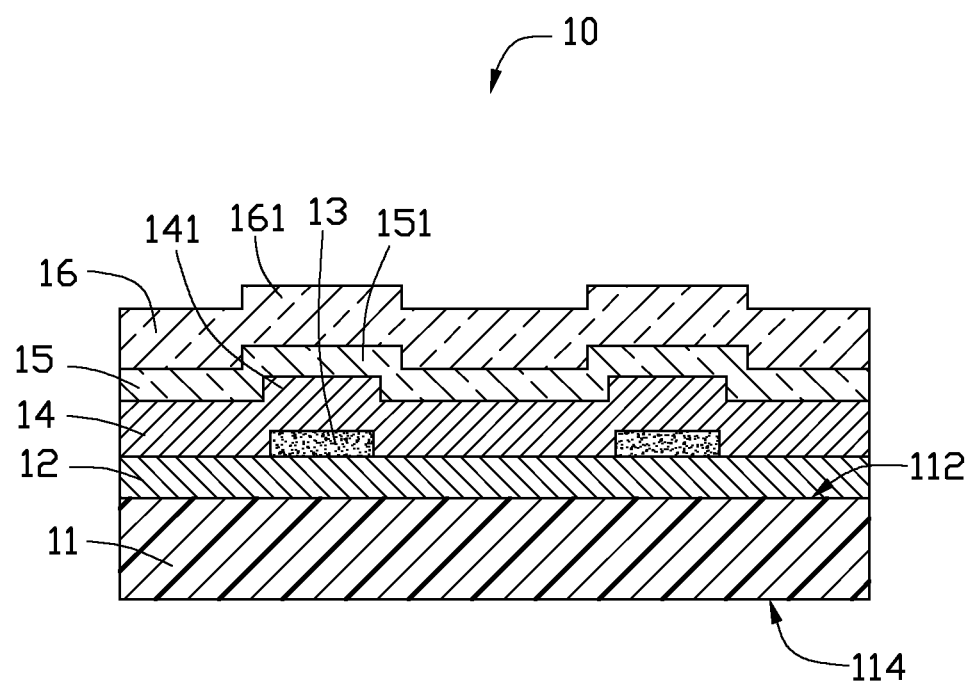

HOUSING FOR ELECTRONIC DEVICES AND METHOD FOR MAKING HOUSING

BACKGROUND

1. Technical Field

The present disclosure generally relates to housings for electronic devices and particularly to housings having metallic appearances and a method for making the housings.

2. Description of Related Art

Many housings for electronic devices such as mobile phones are made from plastic or metal. Metal housings have a better mechanical strength, but are electrically conductive, which may weaken the communication signals. Plastic housings are nonconductive, but lack metallic appearance. Electroplating is usually employed to achieve metallic appearance on plastic housings. However, electrolytes used for electroplating may have undesirable and dangerous properties. In addition, the costs of waste and wastewater treatment for the electroplating process are high.

Therefore, there is room for improvement within the art.

BRIEF DESCRIPTION OF THE DRAWING

Many aspects of the disclosure can be better understood with reference to the following FIGURE. The components in the FIGURE are not necessarily drawn to scale, the emphasis instead being placed upon clearly illustrating the principles of the disclosure.

The FIGURE is a cross-sectional view of an exemplary housing.

DETAILED DESCRIPTION

The FIGURE shows an exemplary embodiment of a housing 10 for an electronic device, such as a mobile phone. The housing 10 includes a substrate 11 made from plastic, a base paint layer 12, a pattern layer 13, a tin layer 14, a silicon oxide layer 15, and a top paint layer 16.

The substrate 11 has an outer surface 112 and an inner surface 114 opposite to the outer surface 112. The base paint layer 12 is directly formed on the outer surface 112. As used in this disclosure, "directly" means a surface of one layer is in contact with a surface of the other layer. The base paint layer 12 adjusts the smoothness of the outer surface 12, improving the attachment strength of the subsequently formed pattern layer 13 and the tin layer 14. In the exemplary embodiment, the paint layer 12 is made of an ultraviolet curable paint. In some embodiments, the paint can be thermosetting paint, for example.

The pattern layer 13 is directly formed on the base paint layer 12 and partially covers the base paint layer 12. The pattern layer 13 may be made from ink or paint. The pattern layer 13 mainly provides a concave-convex tactility for the housing 10. The pattern layer 13 may have a thickness of about 35 μm to about 45 μm, ensuring a three-dimensional tactility. The pattern layer 13 may be formed by multiple printing processes. In the exemplary embodiment, the pattern layer 13 is an ink layer having a thickness of about 40 μm. The pattern layer 13 also forms desired patterns on the housing 10.

The tin layer 14 is directly formed on the pattern layer 13 and covers the pattern layer 13 and portions of the base paint layer 12 not covered by the pattern layer 13. The tin layer 14 provides a metallic appearance for the housing 10. The tin layer 14 may be non-continuous by maintaining the thickness of the tin layer 14 to less than 0.1 μm, the tin layer 14 will be nonconductive and not interfere with the transmission of radio frequency signals (RF). In the exemplary embodiment, the thickness of the tin layer 14 is in a range from about 40 nm to about 100 nm. Within the thickness range from about 40 nm to about 100 nm, the tin layer 14 appears translucent with a light transmission of about 30% to about 70% and the pattern layer 13 is visible through the tin layer 14.

The silicon oxide layer 15 is directly formed on the tin layer 14 and covers the entirety of the tin layer 14. The silicon oxide layer 15 is transparent and mainly protects the tin layer 14 from oxidation during the manufacturing process of the housing 10. The thickness of the silicon oxide layer 15 may be about 0.2 μm to about 1.0 μm.

The top paint layer 16 is directly formed on the silicon oxide layer 15 and entirely covers the silicon oxide layer 15. The top paint layer 16 is made from transparent paint and is highly rigid, protecting the surface of the housing 10 from abrasion and damage. In the exemplary embodiment, the top paint layer 16 is made from a transparent ultraviolet curable paint.

The tin layer 14, silicon oxide layer 15, and the top paint layer 16 each has protrusions 141 (151, and 161) at portions corresponding to the pattern layer 13. The protrusions 141 (151, and 161) cooperatively have a shape the same as the shape of the pattern layer 13, thereby providing a three-dimensional pattern on the housing 10. Moreover, since the tin layer 14, silicon oxide layer 15, and the top paint layer 16 are transparent, the tin layer 14 also provide a metallic pattern for the housing 10

Experiments show that, when there is no silicon oxide layer 15 overlaying the tin layer 14 but with the top paint layer 16 directly formed on the tin layer 14, the tin layer 14 usually oxidizes and appears yellow before the top paint layer 16 is formed. The silicon oxide layer 15 can protect the tin layer 14 from oxidation after being formed.

A method for manufacturing the housing 10 may include the following steps.

The substrate 11 is provided. The substrate 11 has the outer surface 112 and the inner surface 114.

The substrate 11 is cleaned to remove impurities.

The base paint layer 12 is directly formed on the outer surface 112 by spraying, for example.

The pattern layer 13 is directly formed on the base paint layer 12 and partially covers the base paint layer 12. The pattern layer 13 may be formed by multiple printing processes to obtain a desired thickness ensuring an obvious three-dimensional tactility when the tin layer 14, silicon oxide layer 15, and top paint layer 16 are formed. In the exemplary embodiment, the pattern layer 13 is made of ink and formed by the screen printing process, two times. Each screen printing process creates an ink layer with a thickness of about 20 μm. Each succeeding screen printing process may be carried out before the ink layer formed by a preceding screen printing process has dried, improving the bonding of the ink layers formed by the multiple printing processes.

A physical vapor deposition device (not shown) is provided. Sputtering and vacuum evaporation both can be implemented in the physical vapor deposition device.

The tin layer 14 is directly formed on the pattern layer 13 by physical vapor deposition carried out in the physical vapor deposition device. The tin layer 14 covers the pattern layer 13 portions of the base paint layer 12 not covered by the pattern layer 13. When the housing 10 is used for communication devices (such as mobile phones), the tin layer 14 can be formed non-continuous by controlling the thickness of the tin layer 14 during the physical vapor deposition, accordingly, the tin layer 14 is nonconductive so it does not hinder the communication signals. In the exemplary, the tin layer 14 is formed by vacuum evaporation. Since the vacuum evaporation is well known, this disclosure does not describe it in detail.

The silicon oxide layer 15 is directly formed on and entirely covers the tin layer 14 by physical vapor deposition carried out in the physical vapor deposition device. In the exemplary embodiment, the silicon oxide layer 15 is formed by sputtering. To shorten the contact time that the tin layer 15 has with the air, the forming of the tin layer 14 and the forming of the silicon oxide layer 15 are carried out successively in the same physical vapor deposition device.

The transparent top paint layer 16 is directly formed on the silicon oxide layer 15 and entirely covers the silicon oxide layer 15. The top paint layer 16 may be formed by spraying.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A housing for an electronic device, comprising:
 a substrate made of plastic, the substrate having an outer surface and an inner surface opposite to the outer surface;
 a base paint layer formed on the outer surface;
 a pattern layer directly formed on the base paint layer and partially covering the base paint layer;
 a tin layer directly formed on the pattern layer and covering the pattern layer and portions of the base paint layer not covered by the pattern layer, the tin layer having a thickness less than 0.1 μm;
 a silicon oxide layer directly formed on the entire tin layer; and
 a top paint layer formed on the silicon oxide layer.

2. The housing as claimed in claim 1, wherein the thickness of the tin layer is in a range from about 40 nm to about 100 nm.

3. The housing as claimed in claim 2, wherein the tin layer has a light transmission of about 30% to about 70%.

4. The housing as claimed in claim 1, wherein the pattern layer is made from ink.

5. The housing as claimed in claim 4, wherein the pattern layer has a thickness of about 35 μm to about 45 μm.

6. The housing as claimed in claim 1, wherein the pattern layer is made from paint.

7. The housing as claimed in claim 6, wherein the pattern layer has a thickness of about 35 μm to about 45 μm.

8. The housing as claimed in claim 1, wherein the top paint layer is transparent.

9. The housing as claimed in claim 1, wherein the tin layer, silicon oxide layer, and the top paint layer each has protrusions at portions corresponding to the pattern layer, wherein the protrusions cooperatively have a shape the same as the shape of the pattern layer, thereby providing a three-dimensional pattern on the housing.

10. A method for making a housing for an electronic device, comprising:
 providing a substrate made of plastic, the substrate having an outer surface and an inner surface opposite to the outer surface;
 forming a base paint layer on the outer surface;
 directly forming a pattern layer on the base paint layer by multiple printing processes, the pattern layer partially covering the base paint layer;
 directly forming a tin layer on the pattern layer by physical vapor deposition, the tin layer covering the pattern layer and portions of the base paint layer not covered by the pattern layer, the tin layer having a thickness less than 0.1 μm;
 directly forming a silicon oxide layer on the tin layer by physical vapor deposition, the silicon oxide layer entirely covering the tin layer; and
 forming a top paint layer on the silicon oxide layer.

11. The method of claim 10, wherein the tin layer, silicon oxide layer, and the top paint layer each has protrusions at portions corresponding to the pattern layer; the protrusions cooperatively have a shape the same as the shape of the pattern layer.

12. The method of claim 10, wherein forming the tin layer and forming the silicon oxide layer are successively carried out in the same physical vapor deposition device.

13. The method of claim 12, wherein the tin layer is formed by vacuum evaporation.

14. The method of claim 12, wherein the silicon oxide layer is formed by sputtering.

15. The method of claim 10, wherein the pattern layer has thickness of about 35 μm to about 45 μm.

16. The method of claim 15, wherein the pattern layer is formed by two times of screen printing processes; a succeeding screen printing process is carried out before the ink layer formed by a preceding screen printing process becoming dried.

17. The method of claim 10, wherein the thickness of the tin layer is in a range from about 40 nm to about 100 nm.

18. The method of claim 17, wherein the tin layer has a light transmission of about 30% to about 70%.

* * * * *